US010970321B1

(12) United States Patent
Mapranath

(10) Patent No.: US 10,970,321 B1
(45) Date of Patent: Apr. 6, 2021

(54) INTELLIGENT TERM AND QUERY GENERATION AND FEEDBACK BASED SELECTIVE EXECUTION

(71) Applicant: Vinod J Mapranath, Los Angeles, CA (US)

(72) Inventor: Vinod J Mapranath, Los Angeles, CA (US)

(*) Notice: Subject to any disclaimer, the term of this patent is extended or adjusted under 35 U.S.C. 154(b) by 2 days.

(21) Appl. No.: 16/137,209

(22) Filed: Sep. 20, 2018

(51) Int. Cl.
*G06F 16/332* (2019.01)
*G06F 16/338* (2019.01)
*G06F 16/33* (2019.01)
*G06N 20/00* (2019.01)

(52) U.S. Cl.
CPC ........ *G06F 16/3326* (2019.01); *G06F 16/334* (2019.01); *G06F 16/338* (2019.01); *G06F 16/3335* (2019.01); *G06N 20/00* (2019.01)

(58) Field of Classification Search
CPC .. G06F 16/3322; G06F 16/951; G06F 16/285; G06F 16/313; G06F 16/90324; G06F 16/245; G06F 16/24528; G06F 16/24539; G06F 16/24547; G06F 16/2457; G06F 16/24578; G06F 16/248; G06F 16/3346; G06F 16/353; G06F 16/447; G06F 16/81; G06F 16/90332; G06F 16/9535; G06F 16/9537; G06F 3/0482; G06F 3/0488; G06F 16/3335; G06F 16/3326
USPC ........................................................ 707/765
See application file for complete search history.

(56) References Cited

U.S. PATENT DOCUMENTS

| | | | |
|---|---|---|---|
| 5,873,076 A * | 2/1999 | Barr | G06Q 30/0623 707/E17.14 |
| 6,169,986 B1 * | 1/2001 | Bowman | G06F 16/3325 |
| 6,769,986 B2 * | 8/2004 | Vancura | G07F 17/32 463/20 |
| 6,954,750 B2 * | 10/2005 | Bradford | G06F 16/3326 |
| 7,865,495 B1 * | 1/2011 | Roizen | G06F 16/3346 707/708 |
| 8,055,669 B1 * | 11/2011 | Singhal | G06F 16/3322 707/765 |
| 2003/0177112 A1 * | 9/2003 | Gardner | G16B 50/00 |
| 2004/0059729 A1 * | 3/2004 | Krupin | G06F 16/3322 |
| 2007/0043723 A1 * | 2/2007 | Bitan | G06F 16/951 |
| 2008/0162478 A1 * | 7/2008 | Pugh | G06F 16/355 |
| 2008/0177994 A1 * | 7/2008 | Mayer | G06F 9/4418 713/2 |

(Continued)

*Primary Examiner* — Sheree N Brown

(57) ABSTRACT

Methods, systems, and apparatus, including computer programs encoded on computer storage media, for automatically generating search terms and queries and selectively executing those queries based on feedback from previous queries. In one aspect, a method using artificial intelligence, natural language processing, and machine learning techniques, includes actions of receiving an input data set and first generating a set of auto-generated terms by using a predetermined and dynamic data filter, a basic utility processor, a multi-word combination generator, and a term tally and sorting processor. Additional actions include generating a primary query for every multi-word combination and generating focus queries for every primary query. Further actions include selectively executing queries in succession on a document server and database only if necessary, based on feedback from previous queries, and aggregating all query search results.

20 Claims, 12 Drawing Sheets

(56) References Cited

U.S. PATENT DOCUMENTS

| | | | |
|---|---|---|---|
| 2011/0055185 A1* | 3/2011 | Bitan | G06F 16/951 707/706 |
| 2011/0078130 A1* | 3/2011 | Roizen | G06F 16/3346 707/706 |
| 2014/0280174 A1* | 9/2014 | Bitan | G06F 16/904 707/740 |
| 2016/0299951 A1* | 10/2016 | Bawri | G06F 16/9535 |

* cited by examiner

In a fiber optical system, there are multiple optical components including lasers, optical attenuators, heaters, and high frequency filters. Lasers are rays of light at a specified wavelength. To wavelength multiplex lasers together, each laser must be at a different wavelength. The wavelengths are then aggregated together using a wavelength multiplexer. On the receiving end, there are optical attenuators that reduce the power of the laser signal.

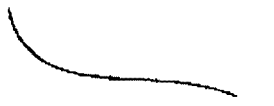
804

FIG. 8

A fiber optical system contains at least one laser, attenuator, and photodiode sensor, where each laser is aggregated; amplified; sent across fiber optic cable; and optically attenuated by various components to reduce the laser signal's power.

300 a after again all also an and another any are as at available away back be before being below between can comprises comprising consists consisting contain

800 away, both, broad, but, by, came, can, cannot, cant, careful, carefully, cause, close, closest, combined, come, coming, consistently, contain, contained, different, direct, directly, do, does, doing, done, each, effectively, effects, efficient, either, else, elsewhere, enough, especially

INTELLIGENT TERM AND QUERY GENERATION AND FEEDBACK BASED SELECTIVE EXECUTION

FIELD

This disclosure relates to automatically generating search terms and queries and selectively executing queries based on feedback from previous queries.

BACKGROUND

Searches are routinely performed on documents, databases, text-based files, and other file types in many different contexts. If a specific search does not yield an individual's desired results, the individual will likely perform another search. If the individual's next search still does not yield the desired results, the individual will likely continue to perform additional searches until the desired results are obtained. Depending on the search criteria or the individual's search terms, the process of performing additional searches may become inefficient and time consuming. Specifically, an individual's selection of additional search terms may only be determined after receiving feedback of the number of results for a previous search query.

SUMMARY

It is an aspect to provide methods, systems, and apparatus for automatically generating search terms and queries and selectively executing those queries based on feedback from previous queries. The methods, systems, and apparatus may be implemented through distributed systems including a client, cloud processing system, and document server and database. One aspect of the subject matter described in this specification can be embodied in methods that include the actions of receiving an input data set of text words and removing any single words from the input data set that are included in a predetermined training data set. The methods may also include removing any single words from the input data set that do not occur more than once in the input data set. The removal of words may also include removing duplicates of any single words from the input data set. In addition, the methods may include removing all plural stems or endings from each single word in the input data set.

The methods may further include removing any single words from the input data set that are included in filtered words of a dynamically determined training data set. Furthermore relating to the dynamically determined training data set, the methods may include retaining any words from the input data set that are included in non-filtered words of the dynamically determined training data set. After filtering words based on the dynamically determined training data set, the methods may include generating multi-word combinations of any remaining single words.

The methods may then include tallying the number of times each single word or multi-word combination occurs in a reference data set and then sorting the single word or multi-word combination.

The methods may then generate a separate primary query for every multi-word combination above and then generate focus queries associated with each of the described primary queries.

After generating the multiple described queries, the methods may include requesting to execute each generated primary query on a document server and database. The methods may additionally include requesting to selectively execute each generated focus query in succession on the document server and database. The requesting to selectively execute each focus query in succession may only occur if necessary which is based on feedback from any of the previously executed queries. After executing these queries, the methods may include receiving query search results in response to each executed primary query and focus queries. Finally, the methods may include aggregating the query search results from the document server and database.

DESCRIPTION OF THE DRAWINGS

FIG. 8 illustrates an example reference data set.

DETAILED DESCRIPTION

This disclosure includes methods, systems, and apparatus, including computer programs encoded on computer storage media, for automatically generating search terms and queries and selectively executing those queries based on feedback from previous queries.

Figure 1:
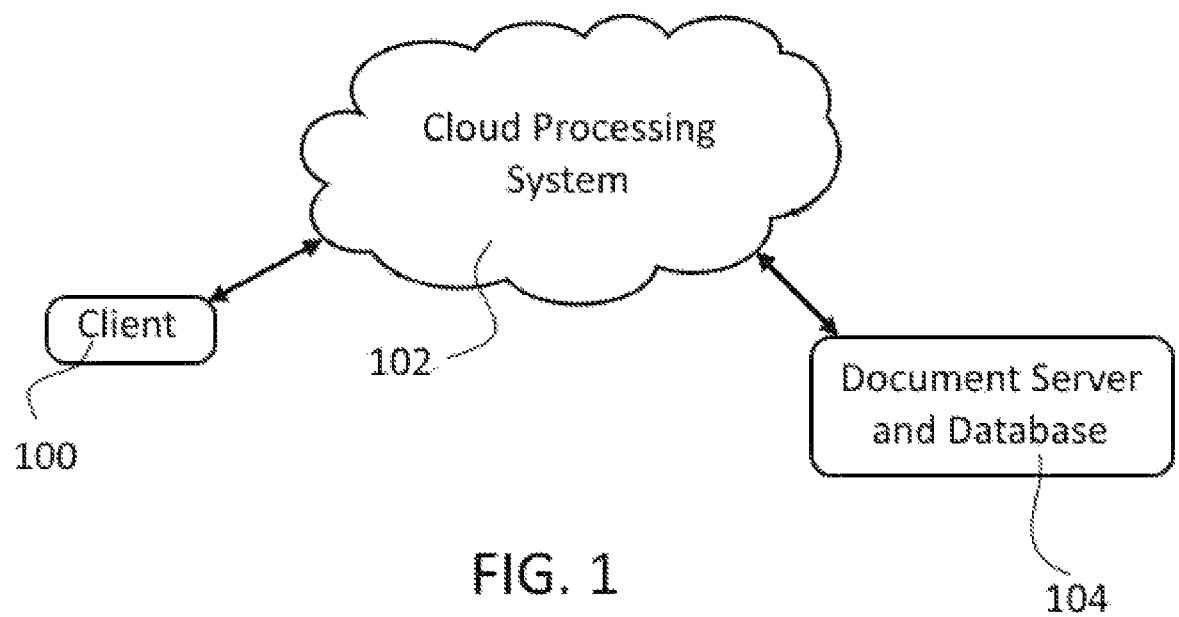
FIG. 1 illustrates an example distributed system for generating terms and queries and executing searches.
Figure 2:
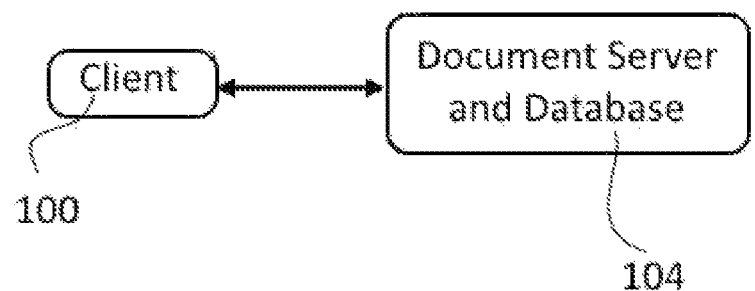
FIG. 2 illustrates an alternative distributed system for generating terms and queries and executing searches.
Figure 3:
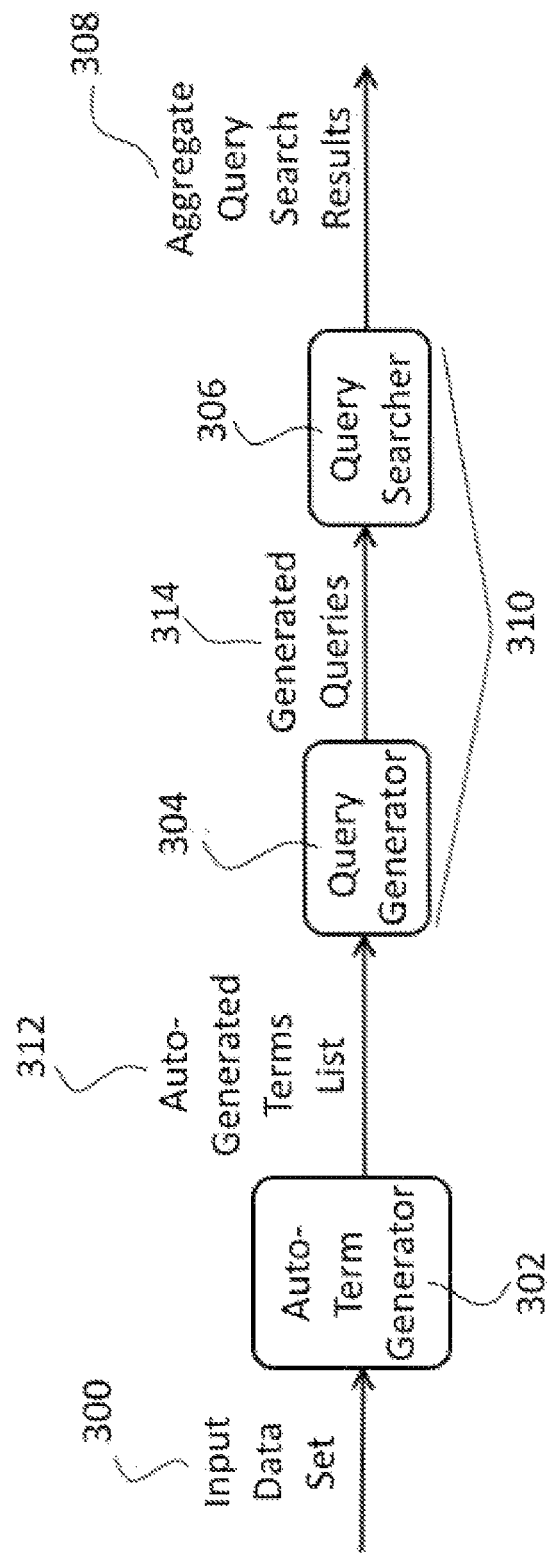
FIG. 3 is a flow chart that illustrates how an input data set may generate query search results.

FIG. 1 shows a distributed system which includes a client 100, cloud processing system 102, and document server and database 104 that will be searched using generated queries 314. FIG. 2 shows an alternative distributed system that includes just a client 100 and document server and database 104. FIG. 3 is a flow chart that illustrates how an input data set 300 is processed by an auto-term generator 302, query generator 304, and query searcher 306 to generate aggregate query search results 308. For example, in one embodiment, the input data set 300 may be the words in the claims or independent claims in an issued patent document or patent publication. In another embodiment, the input data set 300 may be words in the abstract or summary section in an issued patent or patent publication. In another embodiment, the input data set 300 may be the words in the abstract or summary section of a journal article , newspaper article, web-based article, or legal case of interest. The auto-term generator 302, query generator 304, and query searcher 306 functionality in FIG. 3 can occur in the first system illustrated in FIG. 1 using a combination of processing on the client 100 and the cloud processing system 102 or in the alternative distributed system illustrated in FIG. 2 where the processing occurs on the client 100. The subject matter described in this specification may be embodied by systems, methods, apparatus, or computer programs, to process the input data set 300 to generate the aggregate query search results 308. The subject matter described in this disclosure includes artificial intelligence methods, systems, and apparatus including natural language processing and machine learning.

Figure 4:
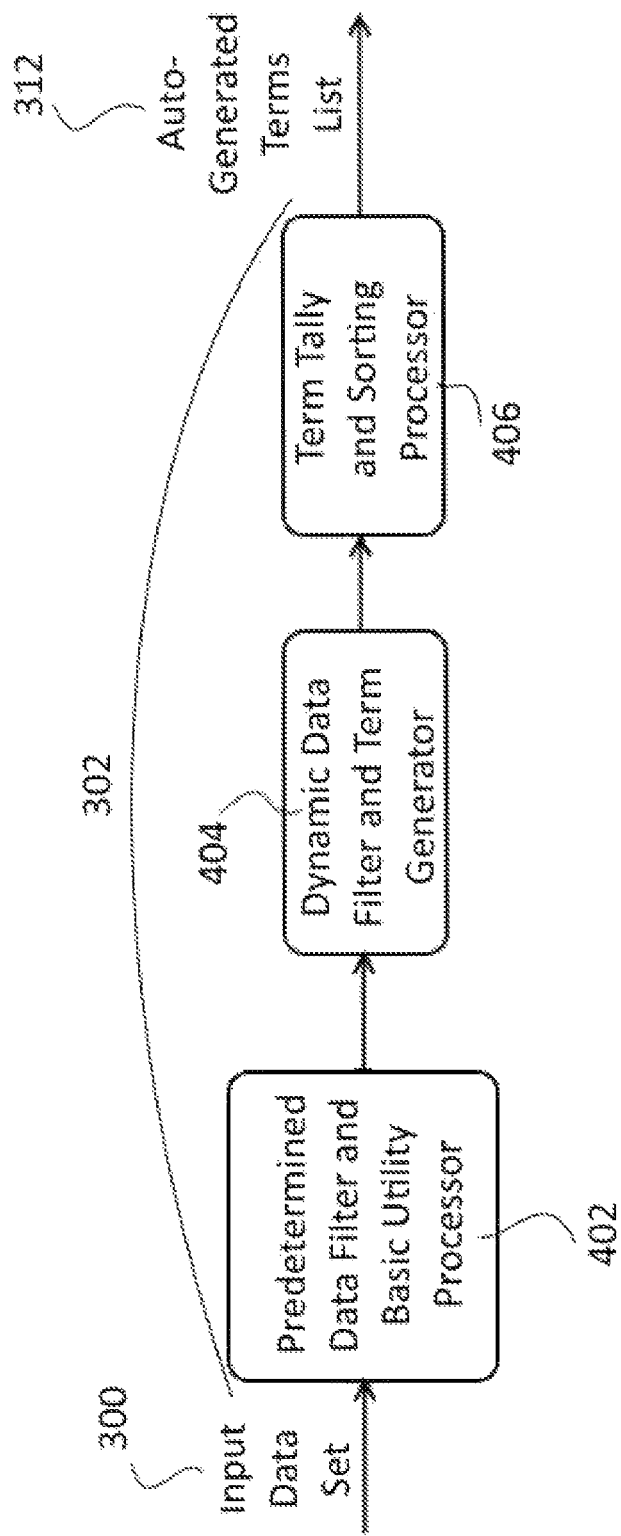
FIG. 4 is a flow chart illustrating an algorithm for an auto-term generator.

FIG. 4 is a flow chart of the auto-term generator 302 algorithm that consists of three stages. The first stage is the predetermined data filter and basic utility processor 402 which includes running a first filter, plural processing, and term generation. The second stage is the dynamic data filter and term generator 404 which consists of running a second filter and generating two and three word combinations or more. The third stage is the term tally and sorting processor 406 that consists of running a single and multi-word tally and sorting the results based on term length and then the number of occurrences of each term in the document.

Figure 5:
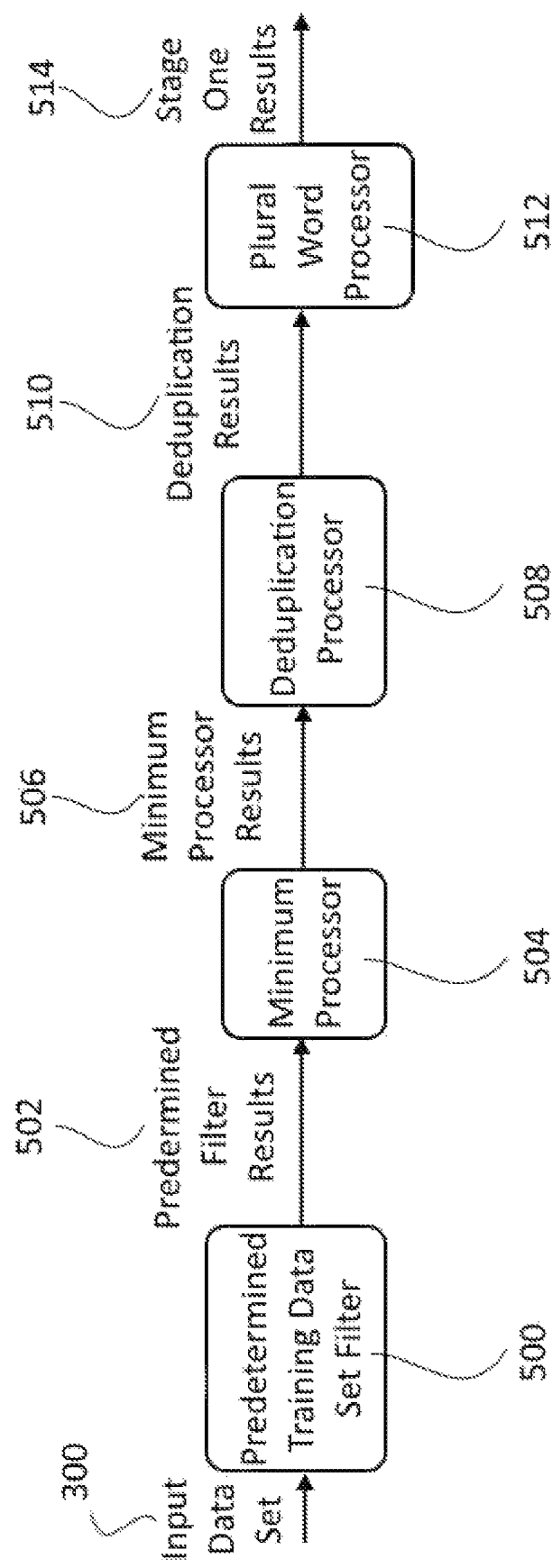
FIG. 5 is a flow chart illustrating an algorithm for a predetermined data filter and basic utility processor.
Figure 6:
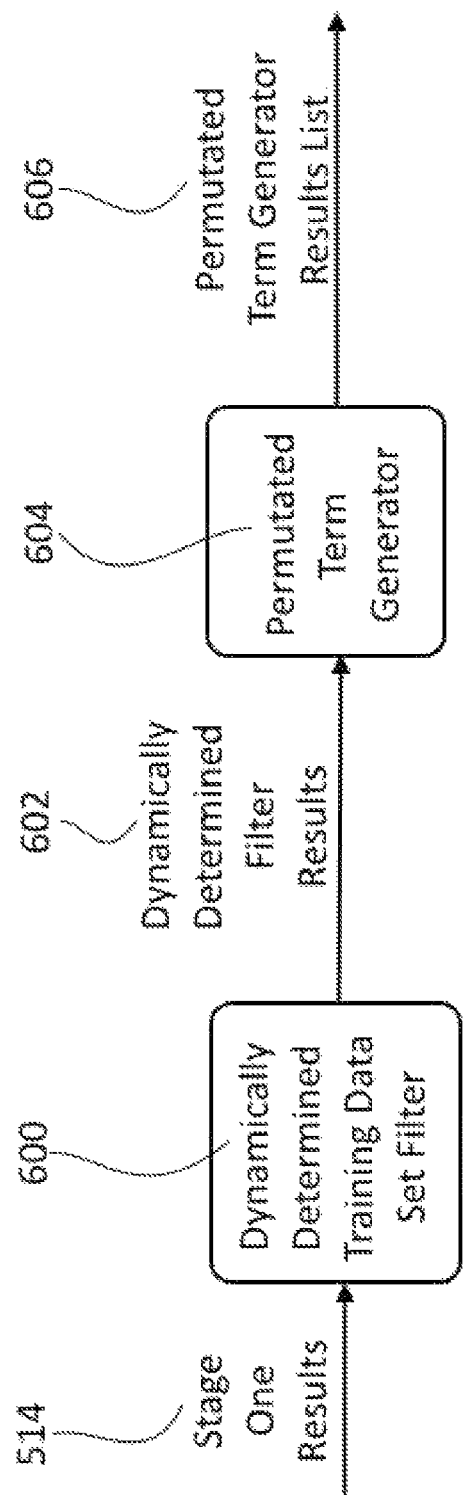
FIG. 6 is a flow chart illustrating an algorithm for a dynamic data filter and term generator.
Figure 7:
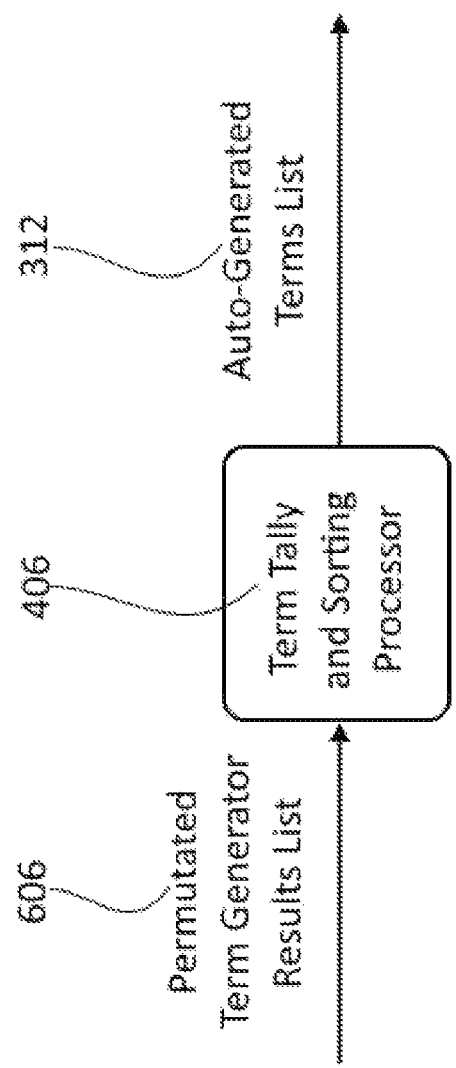
FIG. 7 is a flow chart illustrating an algorithm for a term tally and sorting processor.
Figure 9:
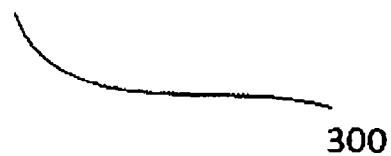
FIG. 9 illustrates an example input data set.
Figure 10:
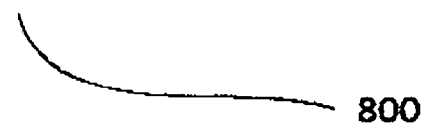
FIG. 10 illustrates an example predetermined training data set.

FIGS. 5-7 are flow charts that show all three stages of the auto-term generator 302 illustrated in FIG. 4. FIGS. 8-11 illustrate four separate sets of data. FIG. 8 illustrates an example reference data set 804. FIG. 9 illustrates an example input data set 300. FIG. 10 illustrates an example predetermined training data set 800 that includes multiple common words that are used in everyday language. The predetermined training data set 800 is constant and does not change throughout the life of the auto-term generator 302 algorithm. For example, in FIG. 5, in one embodiment, the predetermined training data set filter 500 is a list of common words. The predetermined training data set filter 500 processes an input data set 300, using natural language processing parsing and word segmentation techniques, by removing from the input data set 300 any words that are included in the predetermined training data set 800. The predetermined training data set 800 includes words that may be filtered. The predetermined filter results 502 are the resulting data from the predetermined training data set filter 500 process. Then, the minimum processor 504 first checks whether each word in the predetermined filter results 502 occurs at least a minimum of twice in the input data set 300. If a word in the predetermined filter results 502 does not occur more than once, then the minimum processor 504 removes that word from the predetermined filter results 502. The results from the minimum processor 504 are the minimum processor results 506. The deduplication processor 508 then takes the minimum processor results 506 data set and removes any results that occur more than once, so that only one occurrence of each result is present. Simply put, the deduplication processor 508 removes any duplicates of any words in the minimum processor results 506. The results from the deduplication processor 508 are the deduplication results 510.

The following is example text of reference data set 804: "In a long distance fiber optical communications system, there are multiple different optical components including lasers, optical attenuators, gratings, heaters, photodiode sensors, voltage regulators, power supplies, and high frequency filters and radio transmission. Specifically in long distance transmission, data is aggregated together using dense wavelength division multiplexing. First, data originates by switching a laser on and off. Lasers are rays of light at a specified wavelength. To wavelength multiplex lasers together, each laser must be at a different wavelength or frequency. The wavelengths are then aggregated together using a wavelength multiplexer. Then the aggregate laser signals are amplified and sent across a fiber optic cable. A fiber optic cable is made of very small strands of glass. The light from the aggregate and amplified laser signals are transmitted through the fiber optic glass. On the receiving end, there are optical attenuators that reduce the power of the laser signal. Then, the aggregate signal is demultiplexed into individual laser signals with different wavelengths. Then each individual laser signal is received by its own photodiode sensor. Through the photodiode sensor, the laser light signal is converted to electrical energy through the photoelectric effect and is then processed by modern day electronics and software."

The following is example text of input data set 300: A fiber optical system contains at least one laser, attenuator, grating, heater, and photodiode sensor, where each laser is aggregated using wavelength division multiplexing; amplified using optical amplifiers; sent across fiber optic cable or glass; received at a different location and optically attenuated by various components to reduce the laser signal's power; disaggregated using wavelength demultiplexing; and converted to electrical energy through a photodiode sensor.

The following is example text of predetermined training data set 800: a about above active actual actuator additional after again against all also an and another any approximate are around as at available away back be before being below between both but by can comprise comprised comprises comprising consist consisted consists consisting contain containing.

The deduplication results 510 then pass through a plural word processor 512, using natural language processing word stemming techniques, which removes all plural stems or endings from each word in the deduplication results 510. To determine whether a word stem is a plural stem, the plural word processor 512 examines several specific word stems, including words ending with "s," "e," "ing," and others. Words with certain stems may be plural words in some cases, and may be singular words in other cases. The plural word processor 512 will not operate on any deduplication result 510 that contains less than a fixed number of characters. The fixed number of characters is customizable. For example, in one embodiment, the fixed number of characters could be the number four, which means that the plural word processor 512 will not remove any plural stems or endings of words in the deduplication results 510 that are four characters or less. The results from the plural word processor 512 are referred to as stage one results 514.

Figure 11:
FIG. 11 illustrates an example dynamically determined training data set.

FIG. 11 illustrates an example dynamically determined training data set 802 that includes multiple words dynamically generated from news articles, journal articles, books, or other sources. The number of sources may be constant or dynamically growing throughout the auto-term generator 302 algorithm's life. The dynamically determined training data set 802 may learn new common terms automatically as the number of sources grows. In this embodiment, the dynamically determined training data set 802 only contains filtered words, which are words that will be removed from the stage one results 514. In other embodiments, the dynamically determined training data set 802 may include both filtered and non-filtered words. As illustrated in FIG. 6, the dynamically determined training data set filter 600 processes the stage one results 514 by: (1) removing from the stage one results any words that are included in the dynamically determined training data set filtered words; and (2) retaining any words included in the dynamically determined training data set non-filtered words. The dynamically determined filter results 602 are the remaining single words from the dynamically determined training data set filter 600 process.

The following is example text of dynamically determined training data set 802: away, bad, based, basic, basis, be, because, become, becomes, before, began, behind, being, below, best, better, between, beyond, big, bigger, biggest, both, broad, but, by, came, can, cannot, cant, careful, carefully, cause, close, closest, combined, come, coming, consistently, contain, contained, could, couldn't, couple, course, criteria, current, determine, determined, determines, determining, did, didn't, different, direct, directly, do, does, doesn't, doing, done, don't, each, effectively, effects, efficient, either, else, elsewhere, end, ended, enough, especially The inputs to a permutated term generator 604 are single words from the dynamically determined filter results 602. The permutated term generator 604 generates multi-word combinations of single words in the dynamically determined filter results 602. The permutated term generator 604 then creates a new list of terms that includes both the single words from the dynamically determined filter results 602 and the generated multi-word combinations. The permutated term generator results list 606 is the full set of terms including the single and multi-word combination results.

In FIG. 7, the term tally and sorting processor 406 processes each result in the permutated term generator results list 606 by counting the number of times each single and multi-word combination result occurs in a reference data set 804. An example of the reference data set 804 is illustrated in FIG. 8. For example, in one embodiment, the reference data set 804 may be the words in the entire specification of an issued patent document or patent publication. In another embodiment, the reference data set 804 may be all the words in a journal article, newspaper article, web-based article, or legal case of interest. In counting the number of occurrences, the term tally and sorting processor 406 searches for an exact match of each term or result in the reference data set 804. If no exact match occurs, then the tally for that result is zero. The term tally and sorting processor 406 counts a tally or count of each result and stores the tally along with each result. The term tally and sorting processor 406 then sorts the list of all permutated term generator results 606 first by the number of words in the result and then by the number of occurrences of each result in the reference data set 804. After tallying and sorting, the term tally and sorting processor 406 generates the auto-generated terms list 312 which consists of single and multi-word combination terms. The single and multi-word combination terms are organized and stored separately. For example, in one embodiment, the auto-generated terms list 312 may be the most relevant terms or phrases in an issued patent's or patent publication's claims or independent claims. In another embodiment, the auto-generated terms list 312 may be the most relevant terms or phrases in a journal article, newspaper article, web-based article, or legal case of interest.

Figure 12:
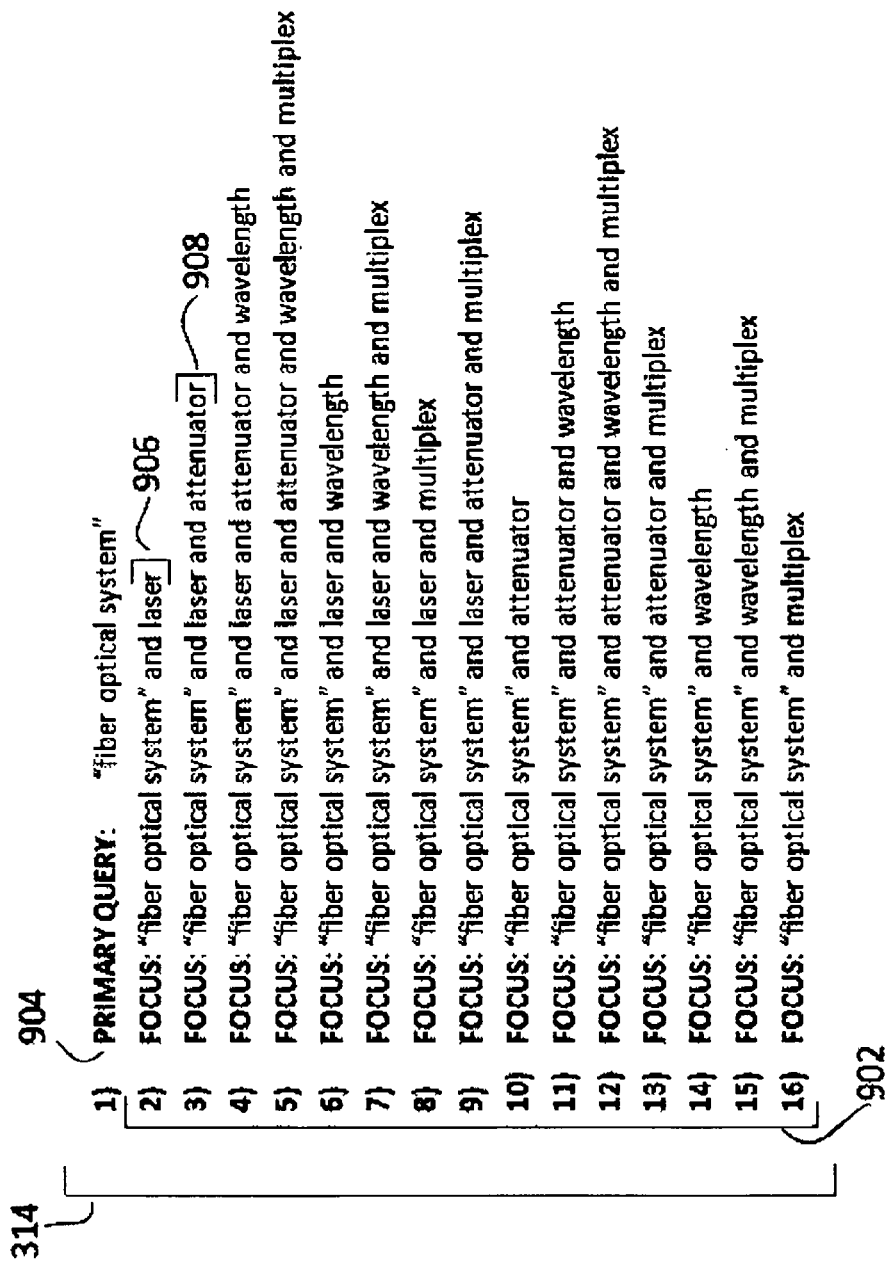
FIG. 12 illustrates a set of generated queries including a primary query and corresponding focus queries.

As in FIG. 3, the query generator and searcher 310 consists of a query generator 304 and a query searcher 306. The query generator 304 uses the auto-generated terms list 312 as a starting point to generate queries, including primary queries 904 and focus queries 902 as illustrated in FIG. 12. For example, in one embodiment, the primary queries 904 and focus queries 902 may represent a superset of the best prior art search queries for an issued patent or patent publication. In another embodiment, the primary queries 904 and focus queries 902 may represent search queries for similar journal articles, newspaper articles, legal cases, or web-based pages. The query generator 304 generates a primary query 904 and then generates focus queries 902 that are in succession which the query searcher 306 will use during the search process if necessary. The query generator 304 may generate a separate primary query 904 for every multi-word combination in the auto-generated terms list 312. In addition, the query generator 304 may generate a separate primary query 904 for every single word term in the auto-generated terms list 312. If the auto-generated terms list 312 includes multi-word combination terms, then the first primary query 904 will be the first multi-word combination term in the auto-generated terms list 312. The query generator 304 will generate focus queries 902 in succession associated with each primary query 904. If the auto-generated terms list 312 includes multi-word combination terms, then an example of a single focus query 906 is the multi-word combination term in the primary query 904 and a combination of one single word term or multiple single word terms. If the auto-generated terms list 312 includes only single word terms, then a single primary query 904 will be a single word term or a combination of multiple single word terms. A primary query 904 is grouped together with its associated focus queries 902 in succession. The set of focus queries 902 associated with a primary query 904 is the multi-word combination term in the primary query 904 and all combinations of single word terms or a subset of single word terms. All focus queries 902 associated with a primary query 904 occur after the primary query 904.

Figure 13:
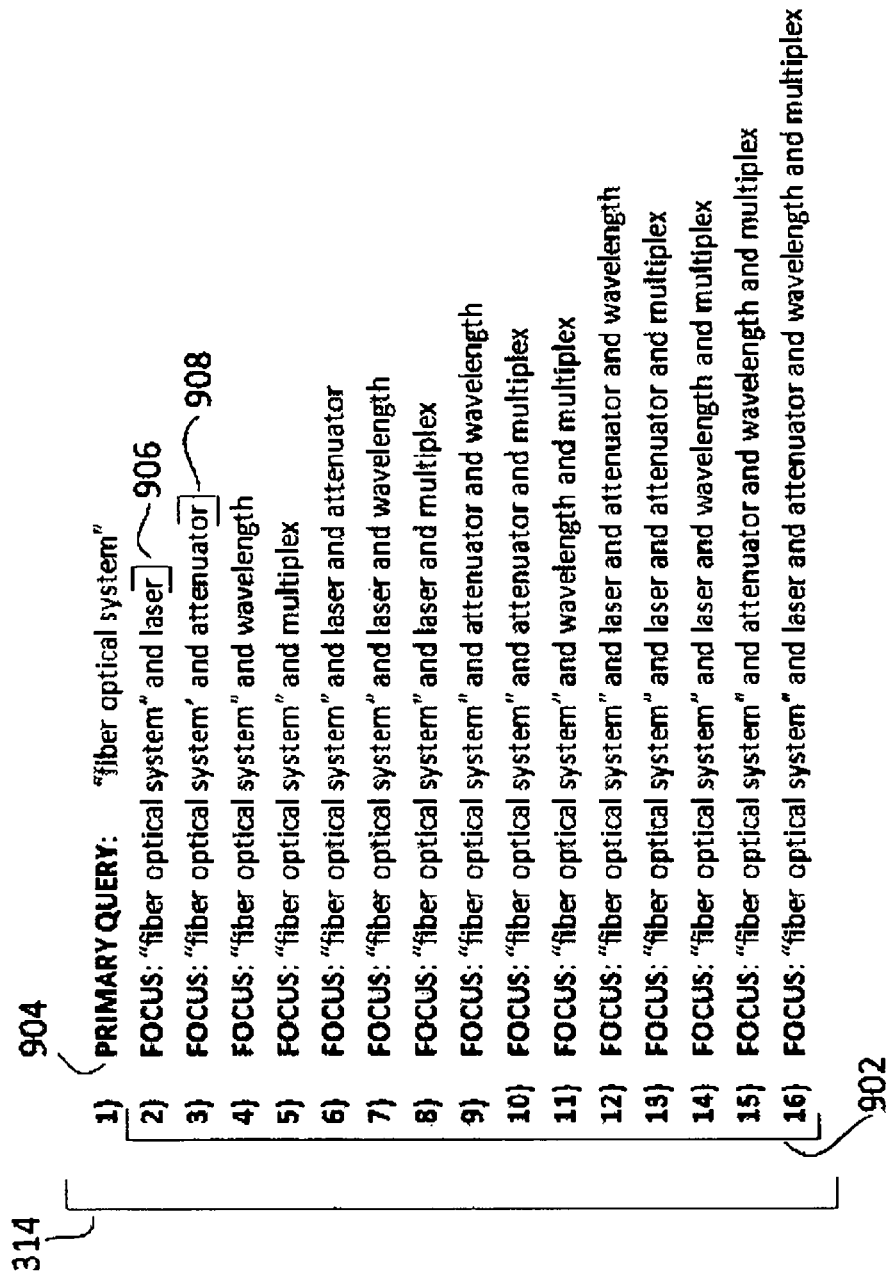
FIG. 13 illustrates an alternative set of generated queries including a primary query and corresponding focus queries.

For example, if the full set of the auto-generated terms list 312 is "fiber optical system," "laser," "attenuator," "wavelength," and "multiplex," then FIG. 12 displays the generated queries 314, including primary and focus queries. In this example, the primary query 904 is "fiber optical system." If there is only a single multi-word combination term in the auto-generated terms list 312, a focus query 906 includes the multi-word combination term and a combination of the single word terms. In FIG. 12, the first focus query 906 is "fiber optical system" and laser using the boolean operator "and" to signify that both "fiber optical system" and laser must be included in any returned results. The goal of each successively generated focus query 908 is to reduce the number of results returned from executing the immediately preceding query, where the results returned in the second successive focus query 908 are a subset of the results from the immediately preceding query. In this example, the first focus query 906 would yield a subset of the previously returned results for the primary query 904. The second successive focus query 908 is "fiber optical system" and laser and attenuator. In this example, the second successive focus query 908 would yield a subset of the previously returned results for the first focused query 906. A primary query's associated focus queries 902 may include the multi-word combination term in the primary query 904 and all permutations or combinations of the single word terms in the auto-generated terms list 312. The generated queries 314 are the complete set of all generated primary queries 904 and their associated focus queries 902. FIG. 13 illustrates an alternative set of queries that could be generated including a primary query 904 and corresponding focus queries 902 in succession.

In FIG. 12, an example of a next successive focus query 908 is "fiber optical system" and laser and attenuator and wavelength. An example of the next twelve successive focus queries 908 in order are: (1) "fiber optical system" and laser and attenuator and wavelength and multiplex; (2) "fiber optical system" and laser and wavelength; (3) "fiber optical system" and laser and wavelength and multiplex; (4) "fiber optical system" and laser and multiplex; (5) "fiber optical system" and laser and attenuator and multiplex; (6) "fiber optical system" and attenuator; (7) "fiber optical system" and attenuator and wavelength; (8) "fiber optical system" and attenuator and wavelength and multiplex; (9) "fiber optical system" and attenuator and multiplex; (10) "fiber optical system" and wavelength; (11) "fiber optical system" and wavelength and multiplex; and (12) "fiber optical system" and multiplex.

In FIG. 13, an example of a primary query 904 is "fiber optical system." An example of the first focus query 906 is "fiber optical system" and laser. An example of the second successive focus query 908 is "fiber optical system" and attenuator. An example of a next successive focus query 908 is "fiber optical system" and wavelength. An example of the next twelve successive focus queries 908 in order are: (1) "fiber optical system" and multiplex; (2) "fiber optical system" and laser and attenuator; (3) "fiber optical system" and laser and wavelength; (4) "fiber optical system" and laser and multiplex; (5) "fiber optical system" and attenuator and wavelength; (6) "fiber optical system" and attenuator and multiplex; (7) "fiber optical system" and wavelength and multiplex; (8) "fiber optical system" and laser and attenuator and wavelength; (9) "fiber optical system" and laser and attenuator and multiplex; (10) "fiber optical system" and laser and wavelength and multiplex; (11) "fiber optical system" and attenuator and wavelength and multiplex; and (12) "fiber optical system" and laser and attenuator and wavelength and multiplex.

In FIG. 3, the query searcher 306 requests to execute searches on a document server and database 104 using all or a subset of the generated queries 314. The query searcher 306 attempts to simulate how a person would expand the number of search terms to narrow results if a primary query 904 returns too many results. For each primary query 904 and its associated successive focus queries 902, the query searcher 306 first requests to execute the primary query 904 search on the document server and database 104. If the document server and database 104 returns a number of query search results that is below a threshold number of results, then the query searcher 306 does not request to execute any focus queries 902 corresponding with the primary query 904 that was executed. If the document server and database 104 returns a number of query search results that is above the threshold of results, then the query searcher 306 begins to request to execute the primary query's focus queries 902 to narrow the results, starting with the first focus query 906.

The query searcher 306 follows the same procedure for a focus query 902. After the query searcher 306 executes the first focus query 906, if the document server and database 104 returns a number of query search results that is above the threshold of results, the query searcher 306 will execute the next focus query 908 to continue successively narrowing results. The query searcher 306 will repeat the same process until either the query search results are below the threshold number of results or all successive focus queries 902 associated with a primary query 904 are complete. If the document server and database 104 returns a number of query search results that is below the threshold number of results, then the query searcher 306 does not execute any more focus queries 902 in succession corresponding to the primary query 904. After executing all searches associated with a primary query 904, the query searcher 306 repeats the same process for all remaining primary queries 904 and their associated successive focus queries 902. The query searcher 306 will only execute the next successive focus query 908 if necessary, specifically if the number of query search results is above the threshold number of results. The aggregate query search results 308 include the results from all individual query search results.

The described query searcher 306 process attempts to automate how a person searches manually. If a person manually executes a primary query 904 which returns too many results, the person will likely start by adding an additional search term to the primary query 904 to create a longer query that will return a more focused response with a fewer number of results. If the additional search term returns fewer, but still too many results, the person may add an additional search term to the growing query. The person may repeat the process of adding additional search terms in succession until the number of query search results is a reasonable resulting set that the person can review and is below a threshold number of results. The query searcher 306 essentially uses the number of query search results from the immediately preceding query, either the primary query 904 or the previous focus query 902, as feedback to guide the query searcher's 306 next focus query. For example, in one embodiment, the query searcher 306 may be automating a process to search for prior art. In another embodiment, the query searcher 306 may be automating a process for executing a search for journal articles, newspaper articles, legal cases, or web-based pages.

The processing for the auto-term generator 302 algorithm, predetermined data filter and basic utility processor 402, dynamic data filter and term generator 404, term tally and sorting processor 406, query generator 304, and query searcher 306 may all occur using a combination of processing on the client 100 and the cloud processing system 102 or may occur exclusively on the client 100.

The systems, methods, apparatus, devices, computer programs, and machines that process the input data set 300 to generate the aggregate query search results 308 include a programmable processor, a computer, or multiple processors or computers. A computer program may also be referred to as a program, software, or software application. A computer program can be written in any programming language, including compiled or interpreted languages. A program can be stored in a portion of a file that holds other programs or data, in a dedicated file that holds no other programs or data, or in multiple files. A computer program can be executed on one client 100 computer or on multiple computers in one location or distributed across multiple locations through a cloud processing system 102 and connected by a communication network. The computer program can be integrated together in a single software product or packaged into multiple software products.

A computer based client may include general or special purpose microprocessors or both, or any other type of central processing unit. Generally, a central processing unit will execute instructions and access data from a read-only memory or a random access memory or both. The essential elements of a computer are a central processing unit for performing or executing instructions and one or more memory devices for storing instructions and data. A computer also has the ability to receive data from or transfer data to storage devices for storing data.

Embodiments of the subject matter described in this specification can be implemented in a combination of a client 100 or clients and a cloud processing system 102 that may include a data server and application server. The client 100 may have a graphical user interface, which may be through a stand-alone application or through a Web browser.

The details of the description are only specific to particular embodiments. The specific details of this description should not limit the scope of the claims. Other embodiments are within the scope of the claims. For example, the steps of the claims can be performed in a different order. In addition, other steps may be included, or steps may be removed, from the described processes. Certain features that may be described as separate embodiments may also be implemented in combination in a single embodiment. In addition, features that may be described as a single embodiment may also be implemented in multiple embodiments or in any appropriate subcombination. It is also possible for features of a claimed combination to be removed from the combination, so that the claimed combination may cover a subcombination or variation.

What is claimed is:

1. A computer-implemented method, comprising:
receiving an input data set of text words;
removing any single words from said input data set that are included in a predetermined training data set;
removing any single words from said input data set that do not occur more than once in said input data set;
removing duplicates of only single words that are of key importance to said input data set;
removing all plural stems or endings from each single word in said input data set;
removing any single words from said input data set that are included in filtered words of a dynamically determined training data set and retaining any words from said input data set that are included in non-filtered words of said dynamically determined training data set;
generating multi-word combinations of any remaining single words;
tallying the number of times a single word or multi-word combination occurs in a reference data set and sorting the single word or multi-word combination;
generating a separate primary query for every multi-word combination;
generating focus queries associated with each primary query;
requesting to execute each primary query on a document server and database;
requesting to selectively execute each focus query in succession on said document server and database based on feedback from any previous queries;
receiving query search results from said document server and database in response to each executed primary query and focus queries; and
aggregating query search results from said document server and database.

2. The method of claim 1, wherein the removing of all plural stems or endings from each single word in said input data set only occurs for single words that are less than a constant number of characters.

3. The method of claim 2, wherein the dynamically determined training data set can be either a fixed set of generated words or a growing set of generated words.

4. The method of claim 2, wherein, in addition to generating a separate primary query for every multi-word combination, a separate primary query is also generated for every single word term.

5. The method of claim 2, wherein the sorting of the single-word or multi-word combination is first done by the number of words in the single word or multi-word combination and then sorted by the number of occurrences of the single word or multi-word combination in the reference data set.

6. The method of claim 2, wherein each focus query is the multi-word combination term in the primary query in combination with one single word term or multiple single word terms.

7. The method of claim 2, wherein the requesting to selectively execute the next focus query in succession stops when the number of query search results for the previously executed query is below a threshold number of results.

8. A non-transitory computer storage medium encoded with a computer program, the computer program comprising instructions that, when executed by data processing apparatus, cause the data processing apparatus to perform operations comprising:
receiving an input data set of text words;
removing any single words from said input data set that are included in a predetermined training data set;
removing any single words from said input data set that do not occur more than once in said input data set;
removing duplicates of only single words that are of key importance to said input data set;
removing all plural stems or endings from each single word in said input data set;
removing any single words from said input data set that are included in filtered words of a dynamically determined training data set and retaining any words from said input data set that are included in non-filtered words of said dynamically determined training data set;
generating multi-word combinations of any remaining single words;
tallying the number of times a single word or multi-word combination occurs in a reference data set and sorting the single word or multi-word combination;
generating a separate primary query for every multi-word combination;
generating focus queries associated with each primary query;
requesting to execute each primary query on a document server and database;
requesting to selectively execute each focus query in succession on said document server and database based on feedback from previous queries;
receiving query search results from said document server and database in response to each executed primary query and focus queries; and
aggregating query search results from said document server and database.

9. The medium of claim 8, wherein the removing of all plural stems or endings from each single word in said input data set only occurs for single words that are less than a constant number of characters.

10. The medium of claim 9, wherein the dynamically determined training data set can be either a fixed set of generated words or a growing set of generated words.

11. The medium of claim 9, wherein, in addition to generating a separate primary query for every multi-word combination, a separate primary query is also generated for every single word term.

12. The medium of claim 9, wherein the sorting of the single-word or multi-word combination is first done by the number of words in the single word or multi-word combination and then sorted by the number of occurrences of the single word or multi-word combination in the reference data set.

13. The medium of claim 9, wherein each focus query is the multi-word combination term in the primary query in combination with one single word term or multiple single word terms.

14. The medium of claim 9, wherein the requesting to selectively execute the next focus query in succession stops when the number of query search results for the previously executed query is below a threshold number of results.

15. A system for generating queries and query search results, the system comprising:

one or more computers; and one or more storage devices storing instructions that are operable, when executed by the one or more computers, to cause the one or more computers to perform operations comprising:

receiving an input data set of text words;

removing any single words from said input data set that are included in a predetermined training data set;

removing any single words from said input data set that do not occur more than once in said input data set;

removing duplicates of only single words that are of key importance to said input data set;

removing all plural stems or endings from each single word in said input data set;

removing any single words from said input data set that are included in filtered words of a dynamically determined training data set and retaining any words from said input data set that are included in non-filtered words of said dynamically determined training data set;

generating multi-word combinations of any remaining single words;

tallying the number of times a single word or multi-word combination occurs in a reference data set and sorting the single word or multi-word combination;

generating a separate primary query for every multi-word combination;

generating focus queries associated with each primary query;

requesting to execute each primary query on a document server and database;

requesting to selectively execute each focus query in succession on said document server and database and based on feedback from previous queries;

receiving query search results from said document server and database in response to each executed primary query and focus queries; and aggregating query search results from said document server and database.

16. The system of claim 15, wherein the removing of all plural stems or endings from each single word in said input data set only occurs for single words that are less than a constant number of characters.

17. The system of claim 15, wherein the dynamically determined training data set can be either a fixed set of generated words or a growing set of generated words.

18. The system of claim 15, wherein, in addition to generating a separate primary query for every multi-word combination, a separate primary query is also generated for every single word term.

19. The system of claim 15, wherein each focus query is the multi-word combination term in the primary query in combination with one single word term or multiple single word terms.

20. The system of claim 15, wherein the requesting to selectively execute the next focus query in succession stops when the number of query search results for the previously executed query is below a threshold number of results.

* * * * *